United States Patent [19]

Yamada

[11] Patent Number: 4,802,777
[45] Date of Patent: Feb. 7, 1989

[54] PRINT WHEEL AND CARRIAGE DRIVE SYSTEM FOR A PRINTER

[75] Inventor: Yasuaki Yamada, Matsudo, Japan

[73] Assignee: Canon Kabushiki Kaisha, Tokyo, Japan

[21] Appl. No.: 27,123

[22] Filed: Mar. 16, 1987

Related U.S. Application Data

[63] Continuation of Ser. No. 837,667, Mar. 4, 1986, abandoned, which is a continuation of Ser. No. 629,751, Jul. 12, 1984, abandoned, which is a continuation of Ser. No. 575,720, Feb. 1, 1984, abandoned, which is a continuation of Ser. No. 380,398, May 20, 1982, abandoned.

[30] Foreign Application Priority Data

Oct. 19, 1981 [JP] Japan ................ 56-166611
Oct. 19, 1981 [JP] Japan ................ 56-166612

[51] Int. Cl.⁴ .................................. B41J 1/30
[52] U.S. Cl. ..................... 400/144.2; 400/320; 400/705.1; 318/7; 318/594
[58] Field of Search ........... 400/144, 144.1, 144.2, 400/144.3, 154, 154.4, 155, 162.2, 162.3, 163.1, 320, 322, 705, 705.1, 901; 318/7, 569, 571, 594, 600, 601, 603; 324/177

[56] References Cited

U.S. PATENT DOCUMENTS

| | | | |
|---|---|---|---|
| 3,568,059 | 3/1971 | Sordello | 324/177 |
| 3,644,806 | 2/1972 | Belson et al. | 318/7 |
| 3,670,228 | 6/1972 | Crosby | 318/594 |
| 3,670,316 | 6/1972 | Matthews et al. | 340/174.1 C |
| 3,696,354 | 10/1972 | Palombo et al. | 340/174.1 C |
| 3,699,555 | 10/1972 | DuVall | 340/174.1 C |
| 3,789,971 | 2/1974 | Deyesso et al. | 400/154.3 |
| 3,837,457 | 9/1974 | Anglin et al. | 400/162.3 X |
| 3,882,988 | 5/1975 | Sloan et al. | 400/320 X |
| 3,954,163 | 5/1976 | Gabor | 400/144.2 |
| 4,058,195 | 11/1977 | Fravel et al. | 400/144.2 X |
| 4,114,750 | 9/1978 | Baeck et al. | 400/320 X |
| 4,169,991 | 10/1979 | Ross | 400/320 X |
| 4,176,977 | 12/1979 | Shepard, Jr. | 400/320 |
| 4,215,943 | 8/1980 | Lau | 400/162.3 X |
| 4,216,415 | 8/1980 | Shimonou et al. | 318/601 X |
| 4,259,626 | 3/1981 | Nomura et al. | 318/603 X |
| 4,293,333 | 10/1981 | Hoffman | 400/144.2 |
| 4,297,040 | 10/1981 | Puch et al. | 400/144.2 |
| 4,307,967 | 12/1981 | Araki et al. | 400/144.2 |
| 4,313,074 | 1/1982 | Nomura et al. | 318/603 X |
| 4,315,200 | 2/1982 | Yamada et al. | 318/603 |
| 4,332,492 | 6/1982 | Thern et al. | 400/320 |
| 4,334,790 | 6/1982 | Link et al. | 400/144.2 |
| 4,338,035 | 7/1982 | Kondo et al. | 400/144.2 |
| 4,459,675 | 7/1984 | Bateson et al. | 318/603 X |

FOREIGN PATENT DOCUMENTS

| | | | |
|---|---|---|---|
| 0015158 | 4/1980 | European Pat. Off. | 400/144.2 |
| 0020024 | 12/1980 | European Pat. Off. | 400/320 |
| 1115881 | 5/1968 | United Kingdom . | |
| 1508552 | 4/1978 | United Kingdom . | |
| 2026205A | 1/1980 | United Kingdom | 400/320 |
| 1585566 | 3/1981 | United Kingdom . | |
| 1595049 | 8/1981 | United Kingdom . | |
| 1603682 | 11/1981 | United Kingdom | 400/320 |
| 2087115 | 5/1982 | United Kingdom | 400/144.2 |

OTHER PUBLICATIONS

IBM Technical Disclosure Bulletin, "Servo Drive With Variable Reference", Bateson et al., vol. 25, No. 2, Jul. 1982, p. 505.
Tickell, "A High-Performance Position Control," IEEE Transactions on Industrial Electronics and Control Instrumentation, vol. IECI-14 No. 1, Apr. 1967.

*Primary Examiner*—Ernest T. Wright, Jr.
*Attorney, Agent, or Firm*—Fitzpatrick, Cella, Harper & Scinto

[57] ABSTRACT

Disclosed is a printer which drives a drive motor for a type wheel or a carriage therefor by a signal derived by processing a first digital signal resulting from a position error signal and a second digital signal which is delayed by a predetermined time period. The digital signals can be processed by an LSI chip which assures a highly reliable, low cost and compact printer.

28 Claims, 4 Drawing Sheets

PRINT WHEEL AND CARRIAGE DRIVE SYSTEM FOR A PRINTER

This application is a continuation of application Ser. No. 837,667 filed 3/4/86, now abandoned, which was a continuation of application Ser. No. 629,751 filed 7/12/84, now abandoned, which was a continuation of application Ser. No. 575,720 filed 2/1/84, now abandoned, which was a continuation of application Ser. No. 380,398 filed 5/20/82, now abandoned.

BACKGROUND OF THE INVENTION

1. Field of the Invention

The present invention relates to a serial printer which drives a type wheel or a carriage therefor and impacts the type wheel while it is stopped to print a character.

2. Description of the Prior Art

In a prior art printer, a type wheel is driven by processing print signals by a combination of hybrid circuits. As a result, the printer is of large size, of low reliability and fails frequently, and hence cannot provide a high quality of print.

SUMMARY OF THE INVENTION

It is an object of the present invention to provide a printer capable of printing characters at a high speed with a high quality.

It is another object of the present invention to provide a printer having an LSI controller.

According to the present invention, there is provided a serial printer such as a typewriter in which a drive motor for a type wheel or a carriage therefor is driven by an analog signal derived by processing a first digital signal resulting from a position error signal and a second digital signal delayed by a predetermined time period, and when a type to be printed has reached a stop region the motor is driven by a composite signal of one quarter period of the analog signal and a phase-shifted version of the analog signal to stop the motor. The processing circuits are constructed in a single LSI chip.

DETAILED DESCRIPTION OF THE PREFERRED EMBODIMENTS

Figure 1:
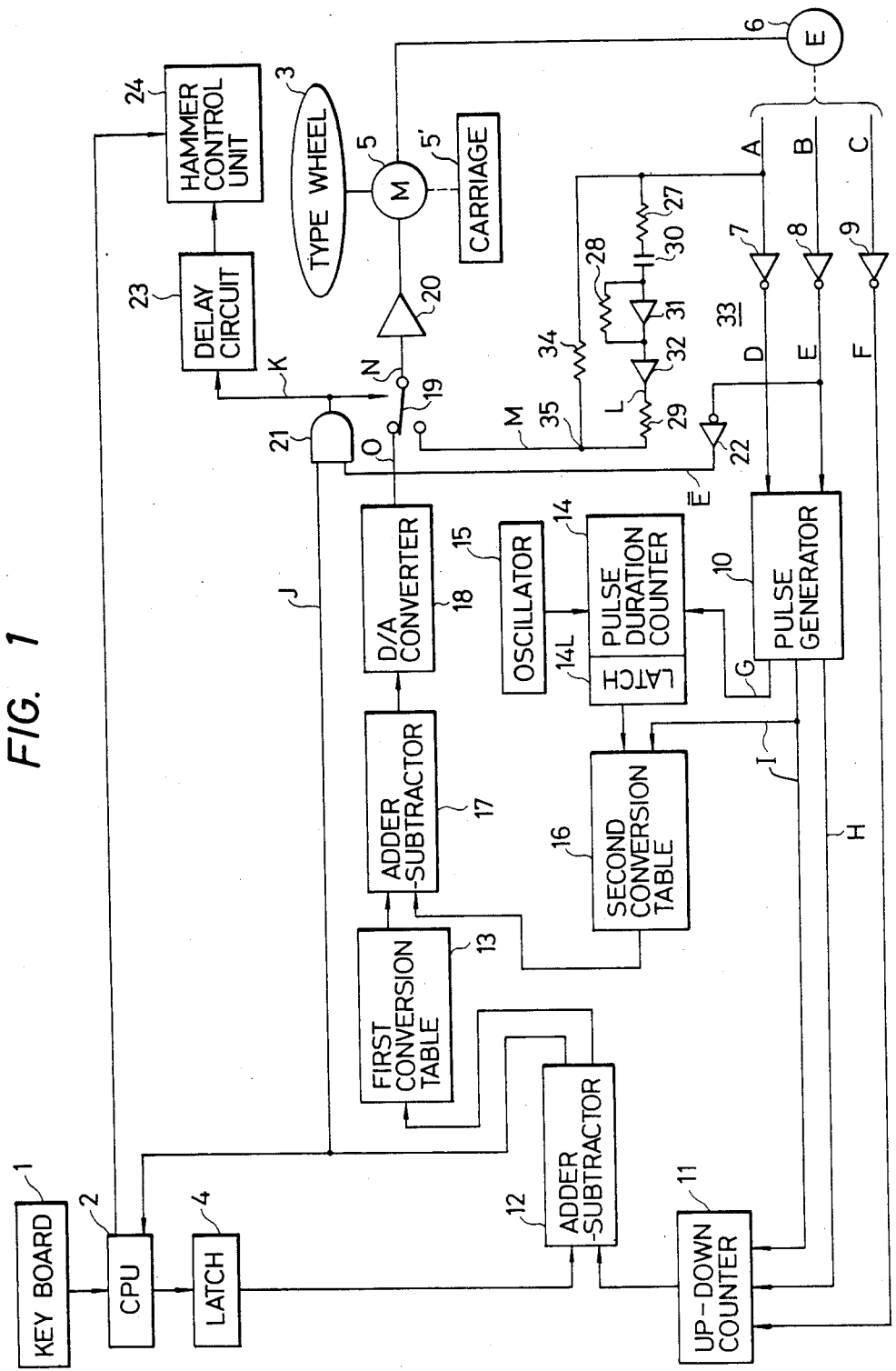
FIGS. 1 and 3 show block diagrams of embodiments of a printer of the present invention.

FIG. 1 shows a block diagram of one embodiment of a type selection control unit in the printer of the present invention. By depressing a key (not shown) on a keyboard 1 which is to be printed, a print signal is generated. The print signal is supplied to a central processing unit (CPU) 2, which decodes a position data indicating a deviation from a reference position (not shown) on a type wheel 3 in accordance with the print signal. The position data is set in a latch 4. Thus, the latch 4 stores a destination position (not shown) for the type to be printed or a stop position of the type wheel 3.

The type wheel 3 is driven by a motor 5. A carriage 5' is optionally coupled to the motor 5. Coupled to a drive shaft (not shown) of the motor 5 is a photo-encoder 6 which comprises a light emitting diode, a photo-diode and a coded disc (all not shown) and senses signals A, B and C related to the rotation of the type wheel 3. The output signals A, B and C from the photo-encoder 6 are generated in a manner shown in FIG. 2. One period of each of the output signals A and B corresponds to one type on the type wheel 3. For example, when 96 types are arranged on the type wheel 3, 96 cycles of signals A and B are generated in one revolution of the type wheel 3. The signal A and the signal B have a phase difference of 90 degrees therebetween so that a direction of rotation of the type wheel 3 is detected. The signal C is generated once in every revolution of the type wheel 3 and defines a reference position of the type wheel 3. The signals A, B and C are supplied to comparators 7, 8 and 9, respectively, where they are compared with reference levels to produce binary digital signals D, E and F (see FIG. 2). The signals D and E are supplied to a pulse generator 10, which generates a pulse train G which is synchronized with rising edges and falling edges of the signals D and E, a pulse train H which is synchronized with the falling edge or the rising edge of the signal D depending on the direction of rotation of the motor 5 to represent information relating to the types, and a pulse I which is "0" when the signal E is retarded from the signal D and "1" when the former is advanced from the latter, that is, a direction discrimination signal I for indicating the actual direction of rotation of the motor 5.

The signal F from the comparator 9 is generated once per revolution of the type wheel 3 and it is a reset pulse to reset a content of an up-down counter 11 to zero. The signals H, I and F are supplied to the up-down counter 11 which counts up or down the pulses H depending on a level of the signal I which indicates the direction of rotation. Accordingly, the count of the up-down counter 11 always indicates the rotation position of the type wheel 3 with the rotation position of the motor 5 when the signal C is generated being a reference 0.

The destination position data of the type wheel 3 stored in the latch 4 and the current position data of the type wheel 3 contained in the up-down counter 11 are supplied to an adder-subtractor 12 which compares those data to digitally calculate a position error to the destination position. A sign of the position error indicates the desired direction of rotation of the motor 5. The position error including the sign is supplied to a first conversion table 13 which may be a ROM to produce a target signal representative of the position error.

The pulses G from the pulse generator 10 are supplied to a pulse interval counter 14 which measures an interval between the pulses G by counting reference pulses from an oscillator 15 and latches the last count in a latch 14L each time when the pulse G arrives. The pulse interval data stored in the latch 14L and the rotation direction signal I are supplied to a second conversion table or a reciprocal conversion table 16 which produces a numeric value proportional to a velocity of the motor 5 including the direction of rotation thereof. This numeric value is proportional to an average velocity in an immediately preceding cycle of the pulse G. That is, a signal is generated one cycle of the pulse G (one quarter of a cycle of the signal A) later.

The target signal from the first conversion table 13 and the numeric value from the second conversion table 16 which is proportional to the average velocity delayed by the predetermined time period are supplied to an adder-subtractor 17 which produces an error signal. A sign of the resulting error signal indicates the desired direction of rotation of the motor 5 and an absolute value of the error signal indicates a magnitude of drive to the motor 5. The error signal is supplied to a D/A converter 18 which converts it to a polarized analog error signal O. The error signal O is supplied to the motor 5 through a switch 19 and an amplifier 20 to drive the motor 5.

The adder-subtractor 12 produces a signal J when the position error is zero, and the signal J is supplied to an AND gate 21, to which a signal $\overline{E}$ which is derived by inverting the signal E from the comparator 8 by an inverter 22 is also supplied. An output signal K of the AND gate 21 is supplied to the switch 19 as a switching control signal and also supplied to a delay circuit 23, which delays the signal K for a sufficient time period for the type wheel 3 to stop after it has reached a stop region. A delayed output signal of the delay circuit 23 is used to activate a hammer control unit 24.

Figure 2:
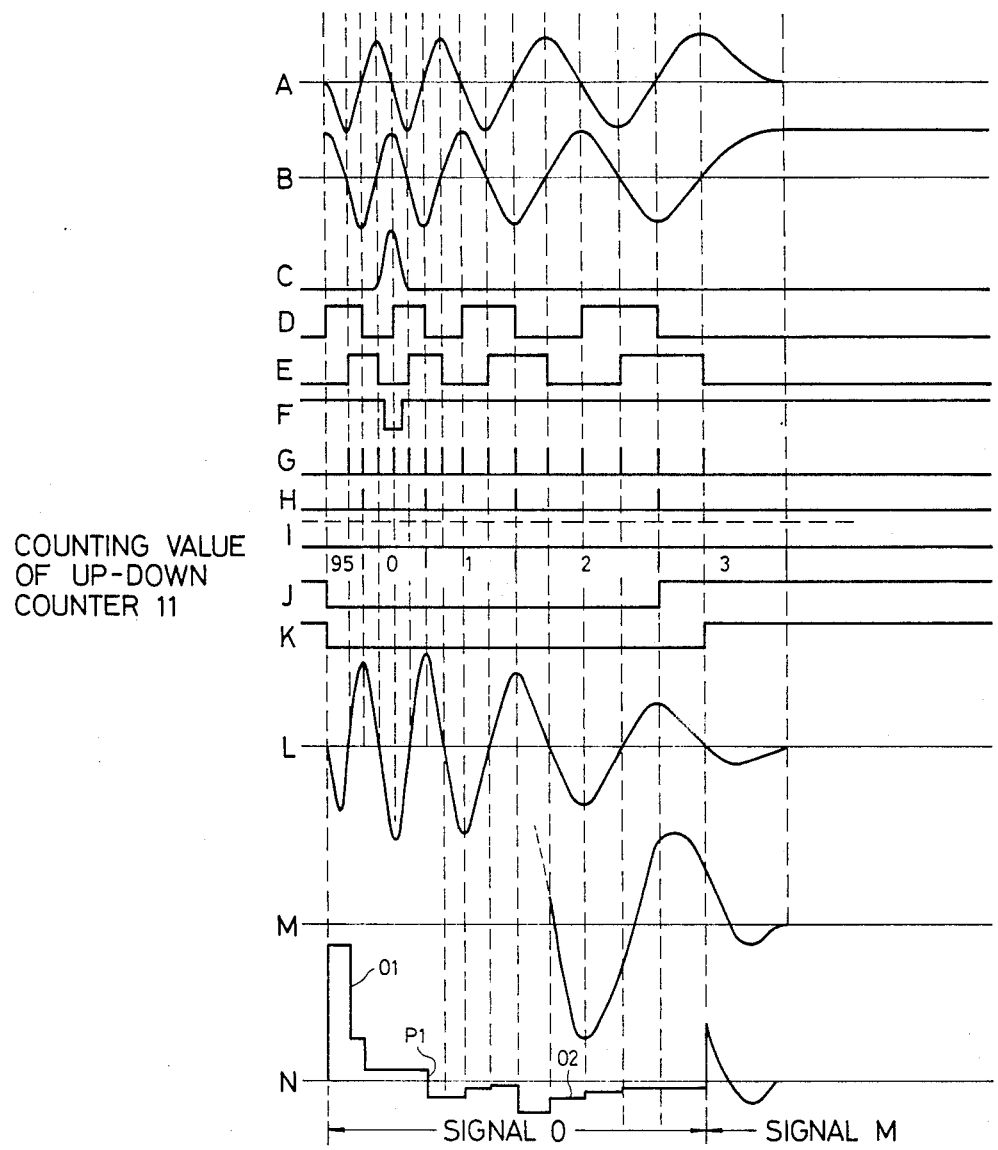
FIGS. 2 and 4 show signal waveforms for the embodiments of FIGS. 1 and 3, respectively.

The signal A is supplied to a phase advance compensation circuit 33 comprising resistors 27, 28 and 29, a capacitor 30 and amplifiers 31 and 32, and to a resistor 34. An output signal L from the phase advance compensation circuit 33 is shown in FIG. 2. By connecting the resistors 27 and 34 together at a junction 35, a signal M which is a sum of the signal L and the signal A is produced at the junction 35. The signal M is supplied to a lower terminal of the switch 19.

FIG. 2 shows the signal waveforms when the motor 5 is driven from the type position "95" of the type wheel 3 to the type position "3". When the data of the type position "3" is latched in the latch 4 as the destination position data, the data "3" is compared with the content "95" of the up-down counter 11 by the adder-subtractor 12, which produces a position error data of "+4". In the adder-subtractor 12, the operation of $3-95=-92$ is first carried out, and since an absolute value of the result is no smaller than 96/2, the operation of $-92+96=+4$ is carried out. In this manner, the direction of rotation and the amount of rotation for a minimum rotation are determined.

On the other hand, since the motor 5 has been in a stopped condition, the signals A and B do not change and the pulse G is not generated. Accordingly, the count of the pulse interval counter 14 indicates a maximum count. When the counter 14 indicates the maximum count, the reciprocal conversion table 16 produces a velocity of zero. The velocity of zero and the value from the first conversion table 13 are summed by the adder-subtractor 17. Since the velocity value is now zero, the value from the first conversion table 13 is supplied to the D/A converter 18. Since the switch 19 is now at the illustrated position, a signal N generated is a left-most value O1 of the D/A converter output O shown in FIG. 2. The motor 5 is accelerated by the signal N and the signals A and B change accordingly and the signals G and H are generated, as shown in FIG. 2. The position error decreases and the count of the counter 14 also decreases and the average velocity from the reciprocal conversion table 16 increases. As a result, the output of the adder-subtractor 17 decreases and the polarity of the signal O is reversed at a point P1 as shown in FIG. 2 so that a signal O2 which generates deceleration torque for the motor 5 is produced. Through such a closed loop control, the motor 5 rotates at a very low speed when the position error is zero or at the region of the destination position "3". When the position error is zero, the adder-subtractor 12 produces the signal J for the position error of zero and the signal J is supplied to the AND gate 21, to which the signal $\overline{E}$ derived by inverting the signal E by the inverter 22 is also supplied. Accordingly, the AND gate 21 opens when the signal E is "0". The output signal K of the AND gate 21 causes the switch 19 to be switched from the position shown in FIG. 1 to the lower position.

When the switch 19 is switched, the signal M is supplied to the amplifier 20. In the stop region, the drive of the motor 5 is controlled by the composite signal M of the phase advance compensation signal L and the last one quarter period of the signal A. The rotation speed of the motor 5 decreases as the signal M approaches zero point and finally the motor 5 stops. Because the motor 5 vibrates if the drive of the motor 5 is controlled only by the signal A, the signal A is supplied to the phase advance compensation circuit 33 to produce the phase-shifted signal L, which is summed with the one quarter period of the signal A to produce the signal M, which in turn is used to drive the motor 5. Consequently, the vibration is quickly attenuated and the motor 5 stops at a zero-crossing point of the signal A.

Figure 3:
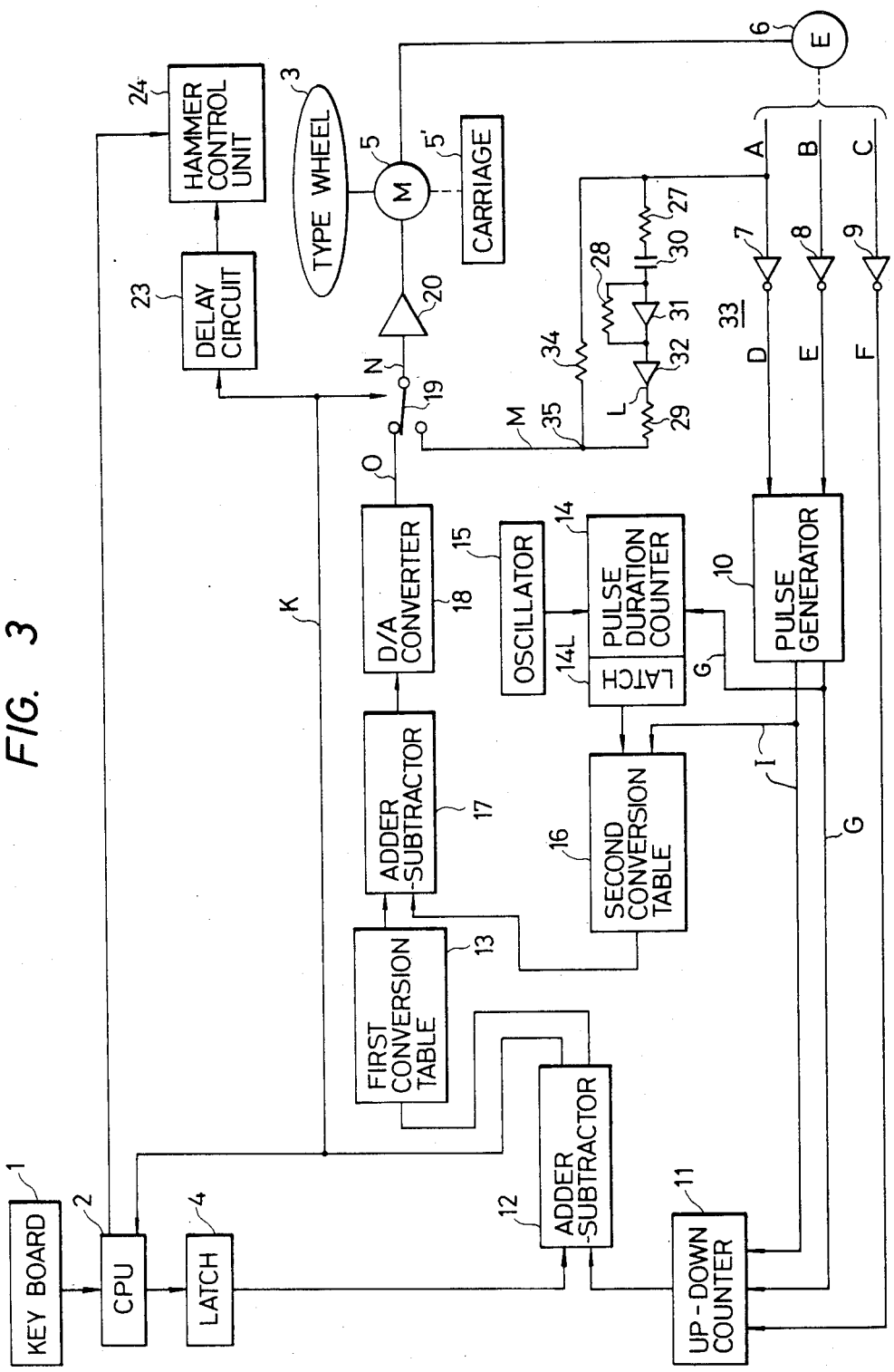

FIG. 3 shows a block diagram of another embodiment of the present invention, which is basically identical to the embodiment of FIG. 1. When a key (not shown) on the keyboard 1 corresponding to a type to be printed is depressed, a print signal is generated. The print signal is supplied to a central processing unit (CPU) 2, which decodes a print data indicating a deviation from a reference position (not shwn) on a type wheel 3 in accordance with the print signal. The position data is stored in a latch 4. Thus, the latch 4 stores a destination position (not shown) for the type to be printed, that is, a stop position of the type wheel 3.

Figure 4:
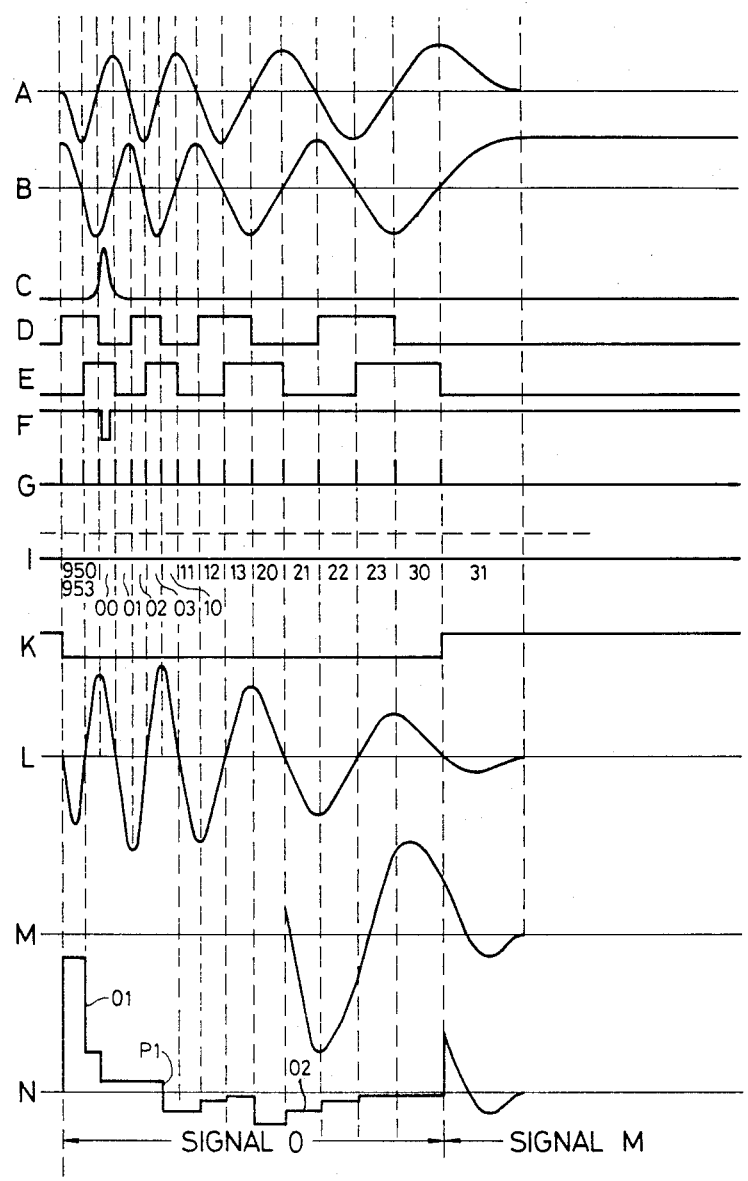

The type wheel 3 is driven by a motor 5. A carriage 5' is optionally coupled to the motor 5. Coupled to a drive shaft of the motor 5 are the type wheel 3 and a photoencoder 6 comprising a light emitting diode, a photo-diode and a coding disc (all not shown). The photo-encoder 6 produces signals A, B and C as the type wheel 3 rotates. The signals A, B and C from the photo-encoder 6 are shown in FIG. 4. One period of each of the signals A and B corresponds to one type of the type wheel 3. For example, when 96 types are arranged on the type wheel 3, 96 signals A and B are respectively generated in one revolution of the type wheel 3. The signals A and B have a phase difference of 90 degrees therebetween so that the direction of rotation of the type wheel 3 is detected. The signal C is generated once per revolution of the type wheel 3 and it defines the reference position of the type wheel 3. The signals A, B and C are supplied to comparators 7, 8 and 9, respectively, where they are compared with reference levels to produce binary digital signals D, E and F, respectively (see FIG. 4). The signals D and E are supplied to a pulse generator 10, which generates a pulse train G which is synchronized with rising edges and falling edges of the signals D and E and a pulse I which is "0" when the signal E is retarded from the signal D and "1" when the former is advanced from the latter, that is, a direction discrimination signal I which indicates an actual direction of rotation of the motor 5.

The signal F from the comparator 9 is generated once per revolution of the type wheel 3 and it is used as a reset pulse to reset a content of an up-down counter 11 to zero. The signals G, I and F are supplied to the up-down counter 11 which counts up or down the pulses G depending on a level of the signal I which indicates the direction of rotation. Accordingly, the count of the up-down counter 11 always indicates the rotation position of the type wheel 3 with the rotation position of the motor 5 when the signal C is generated being a reference 0. The up-down counter 11 is a conventional binary counter. For the sake of convenience, two low order bits thereof are represented by a quadruple number and high order bits are represented by a decimal number. For example, the fifteenth type section from the reference position is represented by 150, 151, 152 and 153, and the stop position of the type is at a boundary of the counts 151 and 152 of the counter 11. The destination position data of the type wheel 3 stored in the latch 4 and the current position data of the type wheel 3 stored in the up-down counter 11 are supplied to an adder-subtractor 12 where they are compared to digitally calculate a position error to the destination position. A sign of the position error indicates the desired direction of rotation of the motor 5. The position error including the sign is supplied to a first conversion table 13 which may be a ROM to produce a target signal corresponding to the position error.

The pulses G from the pulse generator 10 are supplied to a pulse interval counter 14 which measures an interval between the pulses G by counting reference pulses from an oscillator 15 and latches the last count each time when the pulse G arrives. The latched pulse interval data and the rotation direction signal I are supplied to a second conversion table or a reciprocal conversion table 16, which produces a numeric value proportional to a velocity of the motor 5 including the direction of rotation thereof. This numeric value is proportional to an average velocity in an immediately preceding cycle of the pulse G. Thus, a signal is generated one cycle of pulse G (one quarter of a cycle of the signal A) later.

The target signal from the first conversion table 13 and the numeric value from the second conversion table 16 which is proportional to the average velocity delayed by the predetermined time period are supplied to an adder-subtractor 17, which produces an error signal. A sign of the resulting error signal indicates the desired direction of rotation of the motor 5 and an absolute value of the error signal indicates a magnitude of the drive to the motor 5. The error signal is supplied to a D/A converter 18, which converts it to a polarized analog error signal O. The signal O is supplied to the motor 5 through a switch 19 and an amplifier 20 to drive the motor 5.

The adder-subtractor 12 subtracts the content of the latch 4 from the high order bits excluding the two low order bits of the count of the counter 11 and produces a signal K when the position error is zero and the content of the two low order bits of the count of the counter 11 is "1" or "2". The signal K is supplied to the switch 19 as a switching control signal and also applied to a delay circuit 23. The delay circuit 23 delays the signal K for a sufficient time period for the type wheel 3 to stop after it has entered the stop region and the delayed output signal is used to activate a hammer control unit 24.

The signal A is supplied to a phase advance compensation circuit 33 comprising resistors 27, 28 and 29, a capacitor 30 and amplifiers 31 and 32, and to a resistor 34. An output signal L from the phase advance compensation circuit 33 is shown in FIG. 4. By connecting the resistors 27 and 34 together at a junction 35, a signal M which is a sum of the signal L and the signal A is produced at the junction 35. The signal M is supplied to a lower terminal of the switch 19.

FIG. 4 shows signal waveforms when the motor 5 is driven from the type position "95" of the type wheel 3 to the type position "3". When the type position data "30" indicating the target position is latched in the latch 4, the data "30" is compared with the content "950" of the up-down counter 11 excluding the two low order bits by the adder-subtractor 12, which produces a position error data "+40". In the adder-subtractor 12, an operation of 30−950==920 is first carried out, and since an absolute value of the result is no smaller than 960/2, an operatioon of −920+960=+40 is carried out. In this manner, the direction of rotation and the amount of rotation for a minimum rotation are determined.

On the other hand, since the motor 5 has been in a stopped condition, the signals A and B do not change and the pulse G is not generated. Accordingly, the count of the pulse interval counter 14 indicates a maximum count. When the count of the counter 14 is the maximum count, the reciprocal conversion table 16 produces a velocity value of zero. The velocity value of zero and the value from the first conversion table 13 are supplied to the adder-subtractor 17. Since the velocity value is now zero, the value from the first conversion table 13 is supplied to the D/A converter 18. Since the switch 19 is now at the illustrated position, a signal N generated includes a leftmost value O1 of the output O of the D/A converter 18, as shown in FIG. 4. The motor 5 is accelerated by the signal N, and the signals A and B change accordingly as shown in FIG. 4 and signal G is generated. As a result, the position error decreases and the count of the counter 14 also decreases and the average velocity value from the reciprocal conversion table 16 increases. Consequently, the output of the adder-subtractor 17 decreases, and the polarity of the signal O is reversed at a point P1 as shown in FIG. 4 so that a signal O2 which causes a deceleration torque for the motor 5 to be generated is produced. Through such a closed-loop control, the motor 5 rotates at a very slow speed when the position error is zero, that is, in the region of the destination position "3". When the position error is zero and the content of the two low order bits of the counter 11 is "1" or "2", the adder-subtractor 12 produces a signal K which causes the switch 19 to be switched from the position shown in FIG. 3 to the lower position.

When the switch 19 is switched, the signal M is supplied to the amplifier 20. In the stop region, the drive of the motor 5 is controlled by the composite signal M of the phase advance compensation signal L and the last one quarter cycle of the signal A. As the signal M approaches zero, the rotation speed of the motor 5 decreases and finally the motor 5 stops. Because the motor 5 vibrates if the drive of the motor 5 is controlled only by the signal A, the signal A is supplied to the phase advance compensation circuit 33 to produce the phase-shifted signal L, which is added to the one quarter cycle of the signal A to produce the signal M, which in turn is used to drive the motor 5. As a result, the vibration is quickly attenuated and the motor 5 stops at a zero-crossing point of the signal A.

As described hereinabove, the present invention is suitable to construct an LSI controller.

What I claim is:

1. A serial printer comprising:
   a motor;
   a first counter for storing a rotational position of said motor;
   a latch for storing a destination position of said motor;

a first operation unit for receiving outputs from said latch and said first counter and for calculating an amount of position error therefrom;

a first conversion table containing target values corresponding to amounts of position error for receiving an output from said first operation unit;

a pulse generator responsive to a rotation of said motor for generating pulse signals;

a second counter for counting reference pulses generated in an oscillator during one cycle of the pulse signals generated from said pulse generator;

a second conversion table containing a plurality of numeric values associated with average velocities delayed by one cycle of the pulse signals for receiving an output from said second counter;

a second operation unit for receiving target values corresponding to amounts of position error from said first conversion table and numeric values associated with average velocities delayed by one cycle of the pulse signal from said second conversion table and for calculating an error signal from said target values and said numeric values;

a D/A converter for converting an output of said second operation unit into an analog signal;

an analog circuit for generating a signal by combining an analog signal generated during a predetermined period in response to the rotation of said motor and a phase-advanced compensation signal; and a selection switch for temporarily connecting said motor to said analog circuit when said motor reaches a stopping region, said motor otherwise being connected to said D/A converter.

2. A serial printer according to claim 1, wherein a type wheel is coupled to said motor.

3. A serial printer according to claim 1, wherein a carriage is coupled to said motor.

4. Apparatus according to claim 1, further comprising a typefont wheel, and wherein said motor is arranged to drive said typefont wheel.

5. Apparatus according to claim 1, further comprising a carriage, and wherein said motor is arranged to drive said carriage.

6. Apparatus according to claim 1, further comprising a keyboard for defining a signal representative of said destination position of said motor.

7. Apparatus according to claim 1, further comprising a typefont wheel driven by said motor and a keyboard for defining a signal representative of a destination position of said typefont wheel.

8. Apparatus according to claim 5, further comprising a typefont wheel driven by said motor and a keyboard for defining a signal representative of a destination position of said typefont wheel.

9. Apparatus according to claim 5, further comprising a keyboard for defining a signal representative of a destination position of said carriage.

10. A device for moving a movable member to a destination position, comprising:

transducer means for producing a transducer signal dependent upon movement of said member;

means responsive to a transducer signal from said transducer means for producing a digital position signal representative of the current position of said member;

means for producing a digital target position signal representative of the destination position of said member;

means responsive to the digital position signal and the digital target position signal for producing a digital position error signal representative of the position difference between the current position and the destination position of said member;

first conversion table means responsive to the digital position error signal for producing a digital target speed signal representative of a desired target speed for driving said member;

means responsive to the transducer signal produced by said transducer means for generating a digital speed signal representative of the actual speed of said member;

means responsive to the digital speed signal and the digital target speed signal for producing a digital speed error signal representative of the speed difference between the actual speed and the desired target speed for said member;

means responsive to the digital speed error signal for developing a first drive signal to drive said member toward the destination position;

means responsive to the transducer signal produced by said transducer means for deriving therefrom a second drive signal;

means for driving said member in accordance with either one of the first and second drive signals; and means for selectively applying one of the first and second drive signals to said driving means so as to drive said member up to the vicinity of the destination position in accordance with the first drive signal and in the vicinity of the destination position in accordance with the second drive signal to rest at the destination position.

11. A device according to claim 10, wherein said drive means includes an electric motor for moving said movable member, said transducer means being arranged to produce electrical pulse signals indicative of incremental units of movement effected by said electric motor.

12. A device according to claim 11, wherein said means for deriving said second drive signal includes a phase shifting circuit arranged to phase shift said pulse signals to produce said second drive signal.

13. A device according to claim 11, wherein said means for producing said digital position signal includes counting means for counting said pulse signals to derive said digital position signal indicative of the current position of said member.

14. A device according to claim 12, wherein said means for producing said digital position signal includes counting means for counting said pulse signals to derive said digital position signal indicative of the current position of said member.

15. A device according to claim 11 wherein said means for generating said digital speed signal is responsive to said pulse signals.

16. A device according to claim 12, wherein said means for generating said digital speed signal is responsive to said pulse signals.

17. A device according to claim 15, wherein said means for generating said digital speed signal includes oscillator means, a counter arranged to count the oscillations of said oscillator means for periods between consecutive ones of said pulse signals, and conversion table means responsive to said counter for providing said digital speed signal.

18. A device according to claim 16, wherein said means for generating said digital speed signal includes oscillator means, a counter arranged to count the oscillations of said oscillator means for periods between consecutive ones of said pulse signals, and conversion table means responsive to said counter for providing said digital speed signal.

19. A device according to claim 13, wherein said means for generating said digital speed signal is responsive to said pulse signals.

20. A device according to claim 14, wherein said means for generating said digital speed signal is responsive to said pulse signals.

21. A device according to claim 19, wherein said means for generating said digital speed signal includes oscillator means, a counter arranged to count the oscillations of said oscillator means for periods between consecutive ones of said pulse signals, and conversion table means responsive to said counter for providing said digital speed signal.

22. A device according to claim 20, wherein said means for generating said digital speed signal includes oscillator means, a counter arranged to count the oscillations of said oscillator means for periods between consecutive ones of said pulse signals, and conversion table means responsive to said counter for providing said digital speed signal.

23. A device according to claim 10, further comprising switch means for applying to said drive means one of said first and said second drive signals.

24. A device according to claim 23, including means responsive to said first comparator means for operating said switch means.

25. A device for moving a movable member to a selected one of a plurality of discrete positions, comprising:

means for producing a digital position signal representative of the discrete position of said movable member;

means for producing a digital target signal representative of a selected one of said plurality of discrete positions;

means responsive to said digital position signal and said signal target signal for producing a digital position error signal;

means responsive to said digital position error signal for deriving therefrom a first drive signal which is available to drive said movable member toward said selected discrete position;

transducer means for producing transducer signals representative of the movement of said movable member with respect to respective discrete positions;

means responsive to said transducer signals for deriving therefrom a second drive signal which is available to bring said movable member to rest, said second drive signal being generated when said movable member resides in the vicinity of said selected discrete position, the second drive signal being an analog signal synthesized by combining the transducer signals with a phase-advanced transducer signal; and drive means for driving said movable member toward said selected discrete position under control of said first drive signal and for bringing said movable member to rest at said selected discrete position under control of said second drive signal.

26. Apparatus according to claim 25, further comprising a typefont wheel as said movable member, and wherein said drive means is arranged to drive said typefont wheel.

27. Apparatus according to claim 25, further comprising a carriage as said movable member, and wherein said drive means is arranged to drive said carriage.

28. Apparatus according to claim 25, wherein said means for producing a digital position sigal comprises a keyboard for defining said signal respresentative of the discrete position of said member.

* * * * *

UNITED STATES PATENT AND TRADEMARK OFFICE
CERTIFICATE OF CORRECTION

PATENT NO. : 4,802,777
DATED : February 7, 1989
INVENTOR(S) : YASUAKI YAMADA

Page 1 of 3

It is certified that error appears in the above-identified patent and that said Letters Patent is hereby corrected as shown below:

SHEET 1

FIG. 1, "ADDER SUBTRACTOR" should read --ADDER SUBTRACTER--. (both occurrences)

SHEET 3

FIG. 3, "ADDER SUBTRACTOR" should read --ADDER SUBTRACTER--. (both occurrences)

COLUMN 2

Line 39, "adder-subtractor 12" should read --adder-subtracter 12--.
    Line 64, "adder-subtractor 17" should read --adder-subtracter 17--.

COLUMN 3

Line 5, "adder-subtractor 12" should read --adder-subtracter 12--.
    Line 30, "adder-subtractor" should read --adder-subtracter--.
    Line 32, "adder-subtractor 12," should read --adder-subtracter 12,--.
    Line 46, "adder-subtractor 17." should read --adder-subtracter 17.--.

UNITED STATES PATENT AND TRADEMARK OFFICE
CERTIFICATE OF CORRECTION

PATENT NO. : 4,802,777
DATED : February 7, 1989
INVENTOR(S) : YASUAKI YAMADA

Page 2 of 3

It is certified that error appears in the above-identified patent and that said Letters Patent is hereby corrected as shown below:

COLUMN 3

Line 57, "adder-subtractor 17" should read
        --adder-subtracter 17--.
    Line 64, "adder-subtractor 12" should read
        --adder-subtracter 12--.

COLUMN 4

Line 26, "(not shwn)" should read --(not shown)--.

COLUMN 5

Line 12, "adder-subtractor 12" should read
        --adder-subtracter 12--.
    Line 37, "adder-subtractor 17," should read
        --adder-subtracter 17,--.
    Line 46, "adder-subtractor 12" should read
        --adder-subtracter 12--.

COLUMN 6

Line 4, "adder-subtractor 12," should read
        --adder-subtracter 12,--.
    Line 5, "adder-subtractor 12," should read
        --adder-subtracter 12,--.
    Line 6, "30-950==920" should read 30-950=-920--.
    Line 8, "operatioon" should read --operation--.
    Line 20, "adder-subtractor 17." should read
        --adder-subtracter 17.--.

UNITED STATES PATENT AND TRADEMARK OFFICE
CERTIFICATE OF CORRECTION

PATENT NO. : 4,802,777
DATED : February 7, 1989
INVENTOR(S) : YASUAKI YAMADA

Page 3 of 3

It is certified that error appears in the above-identified patent and that said Letters Patent is hereby corrected as shown below:

COLUMN 6

Line 33, "adder-subtractor 17" should read --adder-subtracter 17--.
    Line 41, "adder-subtractor" should read --adder-subtracter--.

COLUMN 8

Line 54, "claim 11" should read --claim 11,--.

COLUMN 10

Line 5, "signal target signal" should read --digital target signal--.
    Line 37, "sigal" should read --signal--.

Signed and Sealed this

Eighth Day of May, 1990

*Attest:*

HARRY F. MANBECK, JR.

*Attesting Officer*      *Commissioner of Patents and Trademarks*